Sept. 6, 1932.     C. F. SULZNER     1,876,176
LOCATION FINDER FOR MICROSCOPES
Filed Dec. 16, 1930
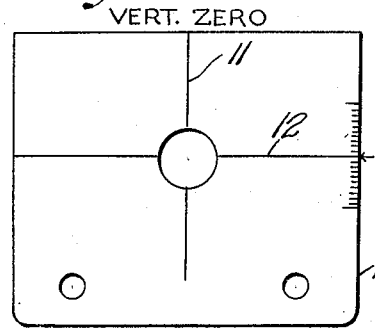
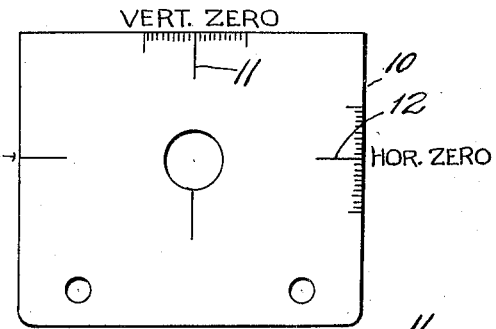
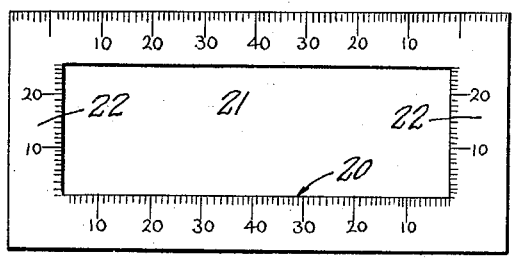
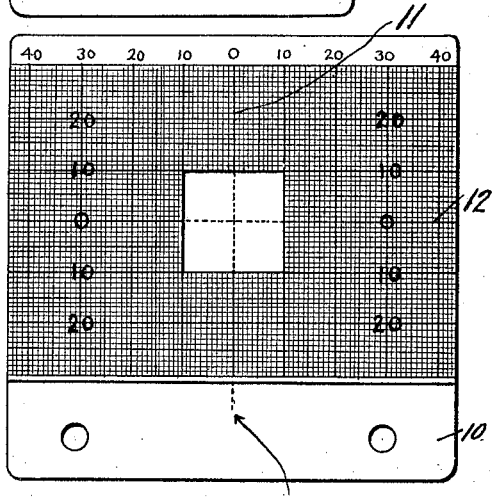
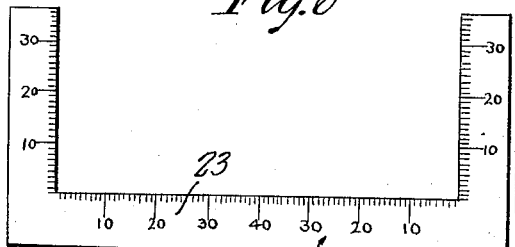
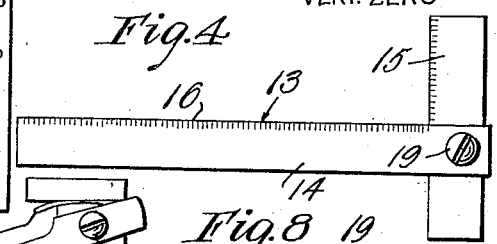
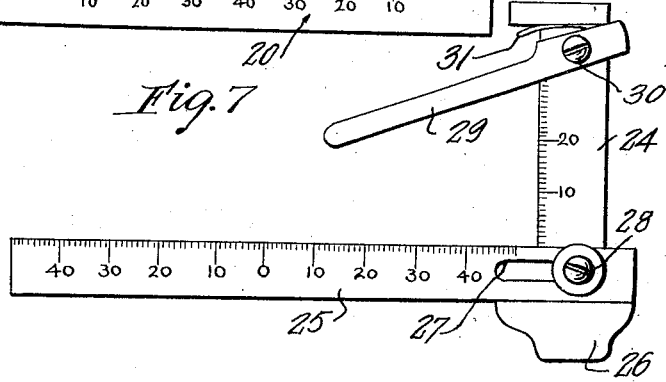
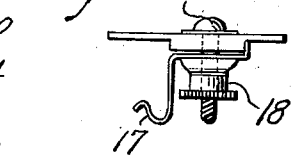
Inventor Charles F. Sulzner Patented Sept. 6, 1932

1,876,170

UNITED STATES PATENT OFFICE

CHARLES F. SULZNER, OF MIAMI, FLORIDA

LOCATION FINDER FOR MICROSCOPES

Application filed December 16, 1930. Serial No. 502,874.

This invention relates to microscope accessories and particularly to means for definitely locating an object on a microscope slide. In the use of microscopes having high power objectives, it is sometimes extremely difficult to locate a particularly small object within the field covered by the cover glass of the slide. Thus, for example, the field may include a very large number of diatoms scattered irregularly over the area protected by the cover glass and it may be that out of all the diatoms disposed in this area, only one diatom is of great importance and to be observed. If no means is provided whereby the position of this particular diatom may be located, the observer, who is desirous of again viewing that same diatom, and though he is thoroughly acquainted with the diatom and may have mounted it, yet is obliged to shift the slide in all directions over the stage of the microscope and as methodically as possible pass over all the area beneath the cover glass before he can locate the particular object he is after and if this is true of the person who has mounted the slide and who knows the general location of this particular diatom and its character, it is still more true of someone else to whom the slide may have been sent and who wishes to observe this particular diatom for comparison or identification.

While I have above referred to the difficulty of locating an individual diatom on a slide, it is obvious that it may be more difficult to locate a particular bacillus or other object, as for instance, some object in tissue which may be the only important object on the entire slide and which may be and usually is not at the optical center of the slide.

The general object of my invention, therefore, is to provide means whereby an object may be located upon a slide with relation to the optical center of the stage of the microscope so that thereafter the slide may be placed in exactly the same position either on the same stage or the stage of another microscope and the object found with celerity and accuracy, and a further object in this connection is to provide a position finder which is used in connection with a microscope stage having zero lines which cross the optical axis of the stage as distinguished from the use of the ends or side edges of the stage.

A further object is to provide a position finder which will be universal in its applicability to all microscopes and to all stages, provided these stages have been marked with the zero lines crossing the optical axis of the stage so that the finding means may be applied to any and either stage without regard to its make or special construction.

A further object is to provide means of this character which is very simple, very accurate and which may be easily used;

Other objects will appear in the course of the following description.

My invention is illustrated in the accompanying drawing, wherein :—

Figure 1 is a top plan view of a microscope stage marked in accordance with my invention;

Figure 2 is a like view of a microscope stage showing a slight variation in the marking from that shown in Figure 1;

Figure 3 is a top plan view of a microscope stage showing more extensive graduations thereon;

Figure 4 is a top plan view of a square which may be used for marking the stage and for indicating the position of the slide thereon;

Figure 5 is a top plan view of one form of my improved location finder;

Figure 6 is a top plan view of a modified form of this location finder;

Figure 7 is a top plan view of an adjustable location finder;

Figure 8 is a sectional view through one of the location finders shown in elevation the nut and clamping spring therefor.

My improved location finder is to be used in connection with a microscope stage having thereon the zero lines hereafter referred to. Such a stage is illustrated in Figure 1 and designated 10. The stage is as usual rectangular in form and formed with the usual central opening $a$ located at the optical axis of the microscope so that the optical axis of the microscope passes through the axis of the stage itself. I have not attempted to illustrate the stage in detail as my device is applicable to all rectangular stages and have merely indicated an ordinary stage.

Marked upon the upper surface of the stage are two zero lines at right angles to each other, one 11 extending through the optical axis of the stage in what I will call a vertical direction and the other extending through the optical axis of the stage horizontally and, therefore, intersecting the line 11 at right angles. I have referred to these lines 11 and 12 as extending entirely across the stage, but it is to be understood that they need not do so, and these lines may extend either from the center outward toward the edges of the of the stage or from the edges of the stage inward toward the center as shown in Figure 2 and it is within the purview of my invention to have the lines extend wholly across the stage or partly across the stage as desired.

In Figure 3, I have illustrated a stage in which the lines 11 and 12 or vertical and horizontal zero lines are paralleled by a series of vertical and horizontal lines extending across the stage at right angles to each other dividing the stage up into parallelograms, each covering an area of a certain number of square centimeters or any other desired unit. I preferably employ a millimeter as the unit of measurement, though we do not wish to be limited to this. Each square defined by the horizontal and vertical lines is in turn divided up into millimeters, both vertically and horizontally.

While I do not wish to be limited to any particular means whereby the stage may be marked, as the stage may be initially marked with the zero lines or subordinate horizontal and vertical lines at the factory itself, yet preferably a modified form of T-square is used for this purpose designated 13 in Figure 4, this square having the blade 14 and the head 15.

The vertical head is disposed at right angles to the horizontal blade and is disposed on a level below the blade so that this head may lie against the side edge of the stage and the blade extend transversely of the stage. This square 13 is preferably made of thin metal or other equivalent material and the blade is graduated in millimeters as at 16. The instrument is provided with a stage engaging spring 17 in Figure 8 held in place by a nut 18 engaging the screw 19. In the use of this device for the purpose of marking the stage, the blade 14 is placed horizontally on the stage so that when viewed through the microscope with a low power, it occupies just half of the field of vision. When that position is secured, this line-marker square may be clamped firmly to the stage by means of the nut 18 and the accuracy of the position verified by again looking through the miscroscope. Then, with a fine needle, the horizontal zero lines may be cut or scratched along the edge of the blade. The graduations 16 also make it possible to transfer to the stage any number of the millimeter spaced lines which may be used as starting points for lines extending parallel to the vertical zero line or for making a vernier scale along one edge of the instrument as shown in Figure 3. The line marker square may be used similarly, to bi-sect the field of vision perpendicularly or vertically so as to mark upon the stage the vertical zero line or lines 11 or any accompanying lines in whole or in part. White or colored paint or cement may be rubbed into the lines, cuts, or scratches on the stage, so as to leave permanent, distinct lines upon the stage for use with the location finders now to be described.

I have devised two general forms of location finders, one form being illustrated in Figure 5 and the other in Figure 6. In Figure 5, I have shown what I call the fixed parallelogram location finder. This is made of thin metal or other equivalent material and is in the form of a rectangular frame designated generally 20. This frame is cut out at the center as at 21 to form a rectangular opening the size of a standard slide as used with miscroscopes. In Figure 5, the frame is closed on all sides. In Figure 6, the frame is open on one side, but in either form of the device, the frame has a length the same as the length of a standard miscroscope slide so that the slide fits between the arms 22, these arms being connected by the longitudinally extending portion 23. Each of these parallelogram location finders bears on its longitudinal inside edges, scales or graduations preferably in millimeters. I do not wish to be limited to the graduations on the scales, but as illustrated, the longitudinal middle of each longitudinal arm of the finder carries the numeral 40 and the distance between this graduation 40 and the inside edges of the ends of the frame is divided into four sections of ten millimeters each. The vertical arms of the scale may be coarsely divided into ten, twenty and thirty millimeter graduations, and the space between these graduations may in turn be divided into millimeters or any desired fraction. It will be noted that the same graduations are used upon each of the location finders shown in Figures 5 and 6.

It will be understood that the starting point of the horizontal scale and of the vertical scale is at the inside corner of the frame constituting the finder, that is, at the junction of the horizontal with the vertical arm. Either of these location finders shown in Figures 5 and 6 may be made of a flat piece of metal or each may have one end turned at right angles to bear against the edge of the stage and thus be kept parallel to the zero lines of the stage such as the zero lines 11 and 12.

In Figure 7, I show an adjustable location finder. This is more complicated and more expensive than the location finders shown in Figures 5 and 6. This location finder is formed of two members 24 and 25. The member 24 is provided with a head 26 at one end, the inner face of this head being at right angles to the side edges of the portion 24 and projecting outward from this portion 24. Resting against this head 26 is the blade 25. This blade is preferably slotted at 27 and an adjusting screw 28 extends down through the slot 27 and through the blade 24 and is provided with a nut 18 as shown in Figure 9 and with a stage engaging spring 17. The blade 25 has a zero mark at its middle and graduations extending from this zero mark in opposite directions, these graduations being shown as indicating 10 millimeter distances between the figures, the space between these main graduations being in turn graduated in millimeters or other fractions. The vertical member 24 is also graduated in millimeters, the zero line for these graduations being the inner edge of the blade 25. Opposed to the blade 25 is a spring finger or arm 29 pivoted at 30 and urged downward by a spring 31. The spring finger at its pivotal point is spaced from the blade a distance sufficient to receive an ordinary slide, the spring finger bearing against this slide and urging it against the blade 25. There may be one or more of the clamping springs 17 mounted upon this finder so as to hold it in place on the stage and yet allow it to be moved back and forth on the stage of the microscope.

The blade 25 is slotted so that it may be shifted longitudinally with relation to the member 24 and thus the zero mark or graduation on the blade 25 may be brought into correct alinement or coincidence with the zero mark 11 on the stage 10 while the member 24 bears against the side edge of the stage. This location finder shown in Figure 7 might itself be used as a line marker for marking on the stage the horizontal and vertical zero lines or the accompanying intermediate lines. The zero lines are, however, much more accurately determined by the use of the thinner metal line marker shown in Figure 4 as because of its being of thinner metal, a more definite disposition may be obtained and it may be adjusted, therefore, more accurately to give the zero lines their absolutely accurate position as intersecting the optical axis of the stage.

The position of any slide with relation to the stage may be determined and recorded with either of these two types of location finders (that type shown in Figures 5 and 6 or that type shown in Figure 7) by indicating on the slide itself or on a label attached thereto the vertical and horizontal arm readings when the desired object or field of sight is in the center of the field of vision. For example, a slide having indicated thereon a reading of 34/12 would mean that if the horizontal arm of the indicator (either that shown in Figure 5, 6 or 7) was so disposed that the graduation 34 on the left side of zero was coincident with the zero line on the stage and that if the graduation 12 on the vertical arm of the finder was in coincidence with the zero mark on the stage that then the particular object indicated on that slide would be disposed accurately beneath the optical axis of the instrument. With this adjustment of the parts, the lower end of the slide would be twelve millimeters below the horizontal zero line of the stage and the object will be approximately six millimeters from one side of the lateral edge of the stage. Similarly, a slide having a position written thereon of 12/34 millimeters indicates that the right corner of the slide is the key corner and that its position, in order to find the object on the slide, should be 34 millimeters to the right of the vertical zero line or the zero and the horizontal arm and twelve millimeters below the horizontal line of the stage. It will be seen that with either of these location finders, that is, either the type shown in Figures 5 and 6 or that shown in Figure 7, means is provided for securing a universally applicable location record for any slide, which may be taken directly while the slide is actually in use by the worker as it lies naturally on the stage. No extra work is required; no "ringing" of the object, no removal of the condensers or diaphragms is necessary, nor any time-consuming verification of the location of the object of interest within the ring enclosure after the ring is made, as is now necessary.

To locate or observe anew any given object, point or area on a slide, it is only necessary to place the slide in the location finder and move it so that the key corner lies at the specified distances from the horizontal and vertical zero lines. If care is taken in the original reading of the slide position, relocation will be very easy, a matter of seconds only, saving much time and annoyance, as this method limits the field of search to approximately one square millimeter or less. This direct location method described above is not possible with the more expensive and complex mechanical stages now often used with microscopes, even when they are permanently attached to the stage, as both their positions on the stage and their scale numbering are arbitrarily determined and are not based on the "zero" lines as herein described, and have no definite uniform relation to the optical axis of the microscope; nor are readings with such mechanical stages directly, if at all interchangeable for other microscopes, equipped with mechanical stages, as is the case with records made with location finder measurements based on the zero lines passing through the optical axis.

Furthermore, where "ringing" is used, special regions, points or objects (by india ink, wax, or glass cutting pencils,) such "ringing" may obscure important adjacent areas on the slide, and it is practically impossible and at all times difficult to properly "ring" a slide or an object on the slide where high power objectives are being used and particularly with immersion oil on the slide or with unremovable condensers.

I do not wish to be limited to the exact construction illustrated, as it is obvious that many changes might be made within the purview of this invention, without departing from the principle of the invention as stated in the claims.

I claim:—

1. Means for locating an object on a microscope slide including a microscope stage having longitudinal and transverse zero-lines disposed at right angles to each other and disposed so as to intersect each other, at the optical axis of the microscope and means associated with the slide and coacting with said zero lines for determining the position of a predetermined point on said slide with reference to said longitudinal and transverse zero lines of the stage.

2. Means for locating an object on a microscope slide including a microscope stage having longitudinal and transverse zero-lines disposed at right angles to each other and disposed so as to intersect each other at the optical axis of the microscope, and means graduated in directions at right angles to each other and coacting with said zero lines, for determining the position of a predetermined point on said slide with reference to the longitudinal and transverse zero-lines on the stage.

3. Means for locating an object on a microscope slide including a microscope stage having longitudinal and transverse zero-lines disposed at right angles to each other and disposed so as to intersect each other at the optical axis of the microscope, and means graduated in directions at right angles to each other and related to said zero lines for determining the position of one side edge of the slide with reference to the longitudinal zero line on the stage and determining the position of one end edge of the slide with reference to the transverse zero line on the stage.

4. Means for locating an object on a microscope slide including a microscope stage having longitudinal and transverse zero-lines disposed at right angles to each other to intersect at the optical axis of the microscope, and graduated means for determining the position of said slide on the stage including a frame within which the slide is placed having two arms at right angles to each other, the frame being entirely separate from the stage and being fully movable relative thereto, the two arms and one side edge of the frame being graduated.

5. Means for locating an object on a microscope slide, including a microscope stage having longitudinal and transverse zero-lines at right angles to each other, said lines being disposed to intersect at the optical axis of of the microscope, and graduated means, extending at right angles to each other, for determining the distance of one corner of said slide from each of said zero lines.

6. Means for locating an object on a microscope slide including a microscope stage having longitudinal and transverse zero-lines disposed at right angles to each other to intersect at the optical axis of the microscope, and graduated means for determining the position of said slide on the stage, including a frame, entirely separate from and fully movable upon and over said stage, within which frame the slide is placed and having two arms at right angles to each other, one of the arms being long to extend along the side edge of the slide and the other being short to extend along the end edge of the slide, the long and short arms being graduated whereby the frame may be shifted to bring a graduation of either set of graduations into coincidence with said zero lines respectively.

7. Means for locating an object on a microscope slide including a microscope stage having longitudinal and transverse zero lines disposed at right angles to each other to intersect the optical axis of the microscope, and means for disposing a microscope slide at any predetermined point on said stage including a slide engaging frame having a long arm to rest upon the stage and engage against the long side of the slide and a short arm to rest against the end edge of the slide, the long and short arm having graduations, any one of said graduations of the long and short arm respectively being adapted to be brought into coincidence with the longitudinal or transverse zero lines respectively, said frame having a clamp whereby it may be engaged with the stage and held in its adjusted position.

8. Means for locating an object on a microscope slide including a microscope stage having longitudinal and transverse zero lines disposed at right angles to each other to intersect the optical axis of the microscope, and means for disposing the microscope slide at any predetermined point on said stage including a slide engaging frame having a long arm to rest upon the stage and engage against the long side of the slide and a short arm to rest against the end edge of the stage, the long and short arm having graduations, any one of said graduations of the long and short arm respectively being adapted to be brought into coincidence with the longitudinal or transverse zero lines respectively, said frame having a clamp whereby it may be engaged with the stage and held in its adjusted position, the long arm being longitudinally adjustable upon the short arm.

9. Means for locating an object on a microscope slide including a microscope stage having longitudinal and transverse zero lines disposed at right angles to each other to intersect the optical axis of the microscope, and means for disposing the microscope slide at any predetermined point on said stage including a slide engaging frame having a long arm to rest upon the stage and engage against the long side of the slide and a short arm to rest against the end edge of the stage, the long and short arms each having graduations, any one of said graduations of the long and short arm respectively being adapted to be brought into coincidence with the longitudinal or transverse zero lines respectively, the short arm at one end being provided with a head having an edge face at right angles to the long arm, the long arm resting against said edge face and being longitudinally slotted, a bolt passing through said slot and connecting the long arm to the short arm whereby the long arm may be longitudinally adjusted.

10. Means for locating an object on a microscope slide including a microscope stage having longitudinal and transverse zero lines disposed at right angles to each other to intersect the optical axis of the microscope, and means for disposing the microscope slide at any predetermined point on said stage including a slide engaging frame having a long arm to rest upon the stage and engage against the long side of the slide and a short arm to rest against the end edge of the stage, the long and short arm having graduations, any one of said graduations of the long and short arm respectively being adapted to be brought into coincidence with the longitudinal or transverse zero lines respectively, the short arm at one end being provided with a head having an edge face at right angles to the long arm, the long arm resting against said edge face and being longitudinally slotted, a bolt passing through said slot and connecting the long arm to the short arm whereby the long arm may be longitudinally adjusted, and a spring member mounted upon the opposite end of the short arm and adapted to engage the edge of the microscope slide and force it toward the long arm.

In testimony whereof I affix my signature.

CHARLES F. SULZNER.